United States Patent [19]
Knight et al.

[11] 3,955,891
[45] May 11, 1976

[54] CORRELATION SPECTROMETER

[75] Inventors: Sheldon A. Knight, Sunnyvale; Max Daehler, Belmont, both of Calif.

[73] Assignee: Quantic Industries, Inc., San Carlos, Calif.

[22] Filed: Mar. 4, 1975

[21] Appl. No.: 555,239

Related U.S. Application Data

[63] Continuation-in-part of Ser. No. 432,398, Jan. 10, 1974, abandoned.

[52] U.S. Cl. .............................. 356/74; 250/237 G; 356/97
[51] Int. Cl.² .......................................... G01J 3/42
[58] Field of Search ............... 356/74, 96, 97, 98; 250/237 R, 237 G

[56] References Cited
UNITED STATES PATENTS

| | | |
|---|---|---|
| 3,518,002 | 6/1970 | Barringer et al. .................. 356/97 |
| 3,720,469 | 3/1973 | Harwit ......................... 250/237 R X |
| 3,837,744 | 9/1974 | Egan et al. ......................... 356/97 X |

OTHER PUBLICATIONS

Harwit et al., *Applied Optics,* Vol. 9, No. 5, May 1970 pp. 1149–1154.

*Primary Examiner*—John K. Corbin
*Assistant Examiner*—F. L. Evans
*Attorney, Agent, or Firm*—Flehr, Hohbach, Test Albritton & Herbert

[57] ABSTRACT

A correlation spectrometer which utilizes Hadamard matrix spatial filters on the input and exit sides, the second filter being a composite filter whose elements can be chosen such that the spectrometer output is proportional to any arbitrary linear combination of source spectral intensities.

5 Claims, 7 Drawing Figures

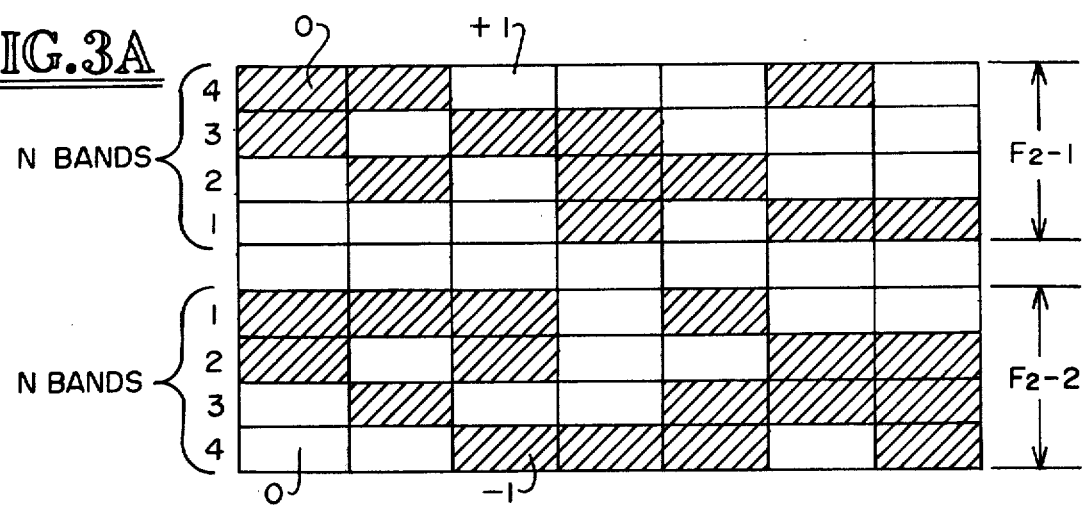
FIG. 3A
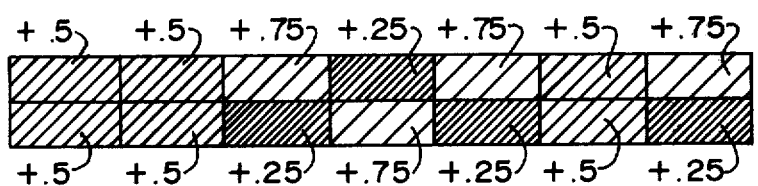
FIG. 3B
FIG. 4
| SPATIAL FILTER RESOLUTION ELEMENT # | 1 | 2 | 3 | 4 | 5 | 6 | 7 | 8 | 9 | 10 | 11 |
|---|---|---|---|---|---|---|---|---|---|---|---|
| BASIC PATTERN → | 1 | 1 | 0 | 1 | 1 | 1 | 0 | 0 | 0 | 1 | 0 |
| $\lambda_1$ → | 1 | 1 | 0 | 1 | 1 | 1 | 0 | 0 | 0 | 1 | 0 |
| $\lambda_2$ → | 0 | 1 | 1 | 0 | 1 | 1 | 1 | 0 | 0 | 0 | 1 |
| $\lambda_3$ → | 1 | 0 | 1 | 1 | 0 | 1 | 1 | 1 | 0 | 0 | 0 |
| $\lambda_4$ → | 0 | 1 | 0 | 1 | 1 | 0 | 1 | 1 | 1 | 0 | 0 |
| $\lambda_5$ → | 0 | 0 | 1 | 0 | 1 | 1 | 0 | 1 | 1 | 1 | 0 |
| $\lambda_6$ → | 0 | 0 | 0 | 1 | 0 | 1 | 1 | 0 | 1 | 1 | 1 |
| $\lambda_7$ → | 1 | 0 | 0 | 0 | 1 | 0 | 1 | 1 | 0 | 1 | 1 |
| $\lambda_8$ → | 1 | 1 | 0 | 0 | 0 | 1 | 0 | 1 | 1 | 0 | 1 |
| $\lambda_9$ → | 1 | 1 | 1 | 0 | 0 | 0 | 1 | 0 | 1 | 1 | 0 |
| $\lambda_{10}$ → | 0 | 1 | 1 | 1 | 0 | 0 | 0 | 1 | 0 | 1 | 1 |
| $\lambda_{11}$ → | 1 | 0 | 1 | 1 | 1 | 0 | 0 | 0 | 1 | 0 | 1 |
COLUMNS J →
ROWS I ↓
BAND TO DETECT

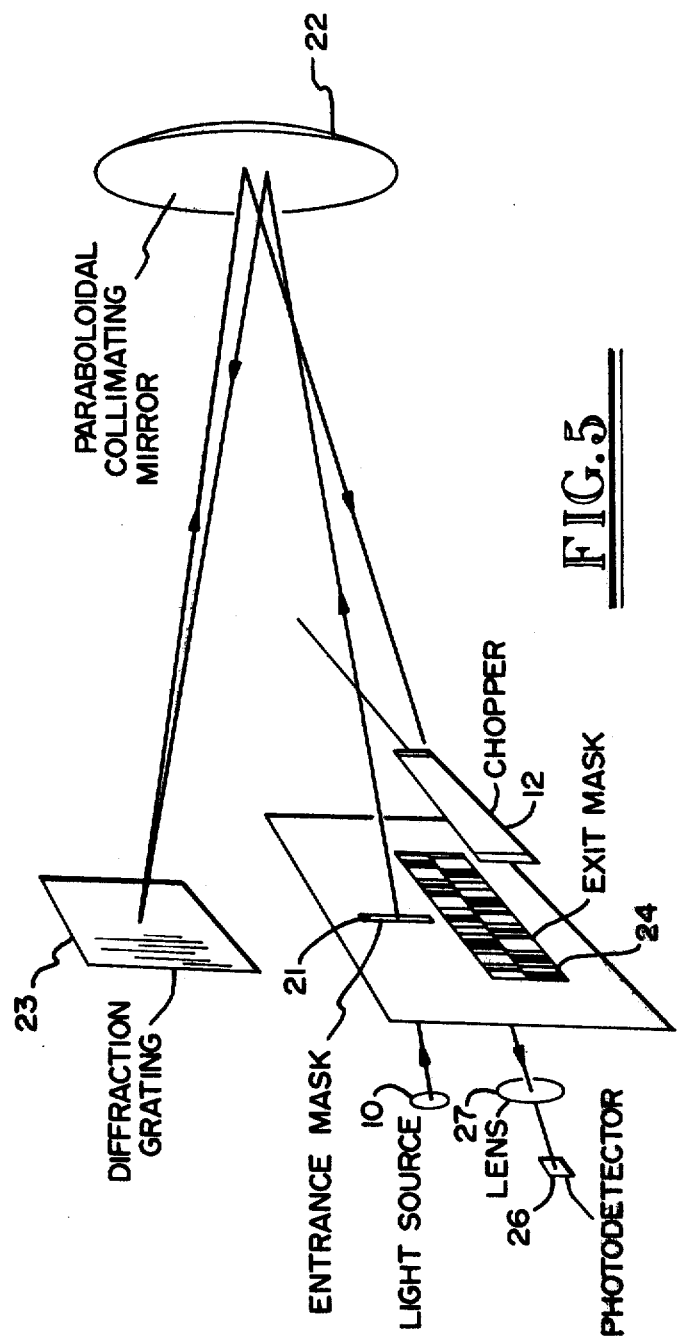

CORRELATION SPECTROMETER

CROSS-REFERENCE TO RELATED APPLICATION

This application is a continuation-in-part of application Ser. No. 432,398, filed Jan. 10, 1974, entitled "Correlation Spectrometer", now abandoned.

BACKGROUND OF THE INVENTION

The present invention is directed to an improved correlation spectrometer and more specifically to a spectrometer which is capable of producing an electrical output proportional to any arbitrary linear combination of source spectral intensities, without physically scanning in wavelength.

As discussed in U.S. Pat. No. 3,578,980 to Decker et al., typical spectroscopic techniques in which the intensity of each wavelength band of interest is recorded in sequence are unsuitable for analysis of a natural light source which is short lived. In addition, the required calculations may be complex and time-consuming.

Decker suggests the use of a movable mask having a series of overlapping arrays. However, this technique still requires complex computations and a mechanical mask moving arrangement.

OBJECTS AND SUMMARY OF THE INVENTION

It is a general object of the present invention to provide an improved correlation spectrometer.

It is another object of the invention to provide a spectrometer which can analyze a light source of multiple wavelengths with a physical instrument which has a minimum of moving parts and which is simple in construction and operation.

It is another object of the invention to provide a spectrometer as above which has optical signal processing capability to thereby eliminate later complex and time-consuming computations.

In accordance with the above objects there is provided a correlation spectrometer comprising a light source producing light of a plurality of different wavelength intervals. Means are provided for dispersing this light. A first spatial filter is provided between the light source and dispersing means. A second spatial filter having photographically opposite first and second portions receives the dispersed light. Chopper means chop the dispersed light to alternatively block the dispersed light from each of the filter portions. Photodetector means sense the light transmitted through the second filter. The first and second filters have similar patterns derived from Hanamard matrices. The filter patterns are a composite of a plurality of filter patterns for a plurality of selected wavelength intervals representing components of the light source which are combined by predetermined weighting to form unitary filters which provide at the photodetector means a weighted linear combination of the intensities of the selected wavelength intervals of the light from the light source.

BRIEF DESCRIPTION OF THE DRAWINGS

FIGS. 3A and 3B are schematic representations of spatial filters useful in understanding the invention;

FIG. 4 is a matrix representation of filter patterns useful in understanding the invention; and FIG. 5 is a schematic perspective view of a spectrometer showing an alternative embodiment of the present invention.

DETAILED DESCRIPTION OF THE PREFERRED EMBODIMENT

Figure 1:
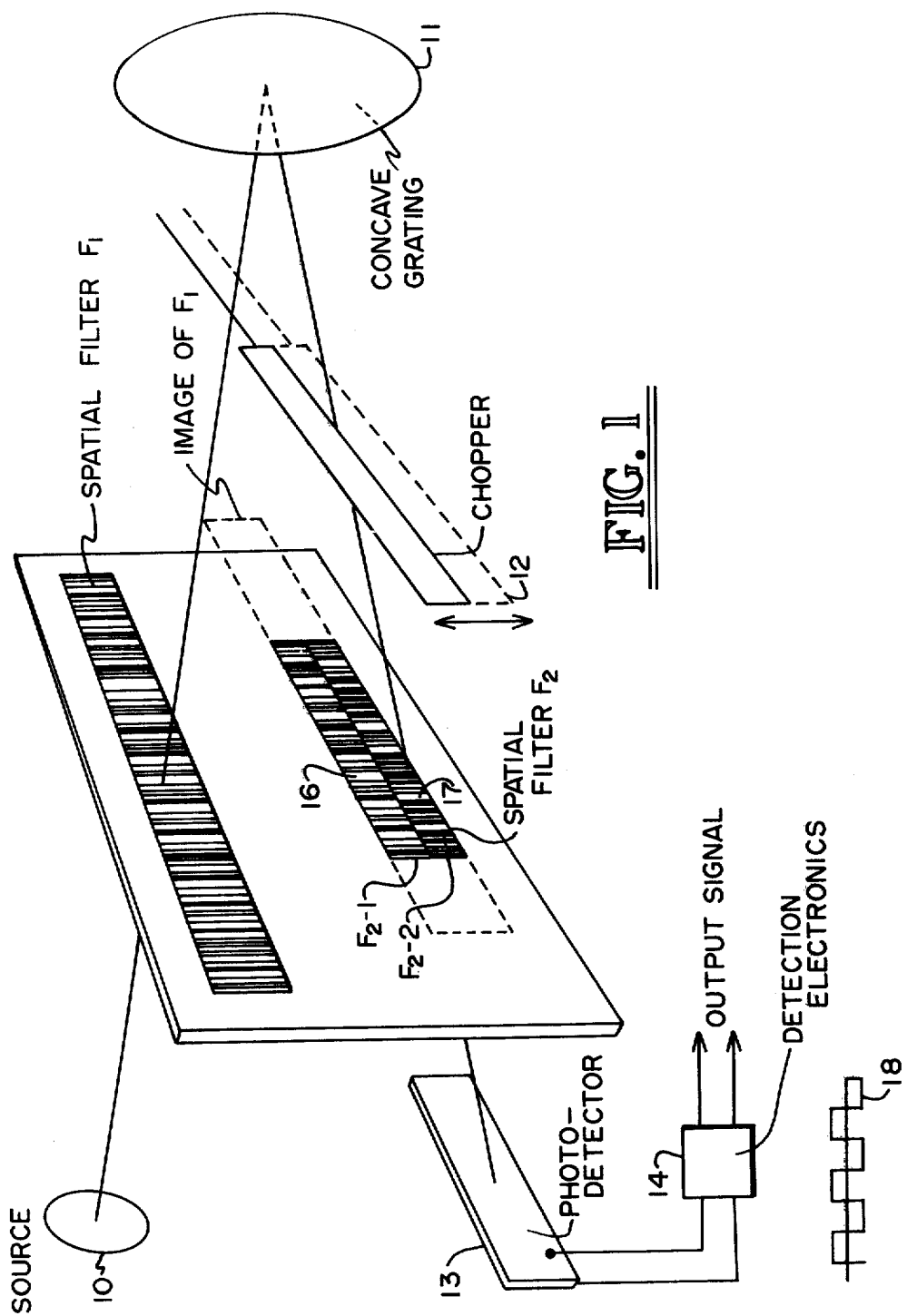
FIG. 1 is a schematic perspective view of a spectrometer embodying the present invention.

The overall physical arrangement of the spectrometer of the present invention is illustrated in FIG. 1. Light from a source 10 passes through a spatial filter $F_1$, is dispersed by a concave grating 11, chopped by a chopper 12. The optical parameters are so chosen that the grating focuses the filter $F_1$ onto a second spatial filter $F_2$. The effect of the grating is to provide dispersion, which results in a translation of the image of $F_1$, along its length, by an amount which depends on wavelength. Light which passes through $F_2$ falls on a photodetector 13 located behind $F_2$. Detection electronics 14 processes the signal from the photodetector to produce an output signal 18 as illustrated. Filter $F_2$ is divided into two halves 16 and 17; the top part is designated $F_2$-1 and the bottom part $F_2$-2. The pattern on the bottom half is a negative of the top; that is, when the top half is opaque the bottom half is transparent and vice versa. $F_2$-1 or the top half 16 has the same pattern as the image of filter $F_1$. Thus, $F_2$-2 is the photographic negative of $F_1$.

In general, the filter $F_1$ consists of two identical patterns of light and dark vertical lines, the two patterns being laid end to end. The filter patterns of $F_2$ are the mirror image of one-half of $F_1$ since the concave reflecting grating 11 causes an inversion of image. The patterns of $F_1$ and $F_2$ and their properties are derived from the properties of Hadamard matrices. A basic pattern with $n$ resolution elements can be obtained from the S matrix derived from a Hadamard matrix of order $(n + 1)$ by first normalizing the Hadamard matrix in a specific way and then eliminating the first row and first column. S is a cyclic matrix, and any row of the S matrix can be used to form the basic pattern used in the spectrometer as described above. The basic pattern is obtained from a row of the S matrix by replacing +1's with 0's and −1's with +1's. The +1's represent transparent elements and the 0's opaque elements.

Figure 2A:
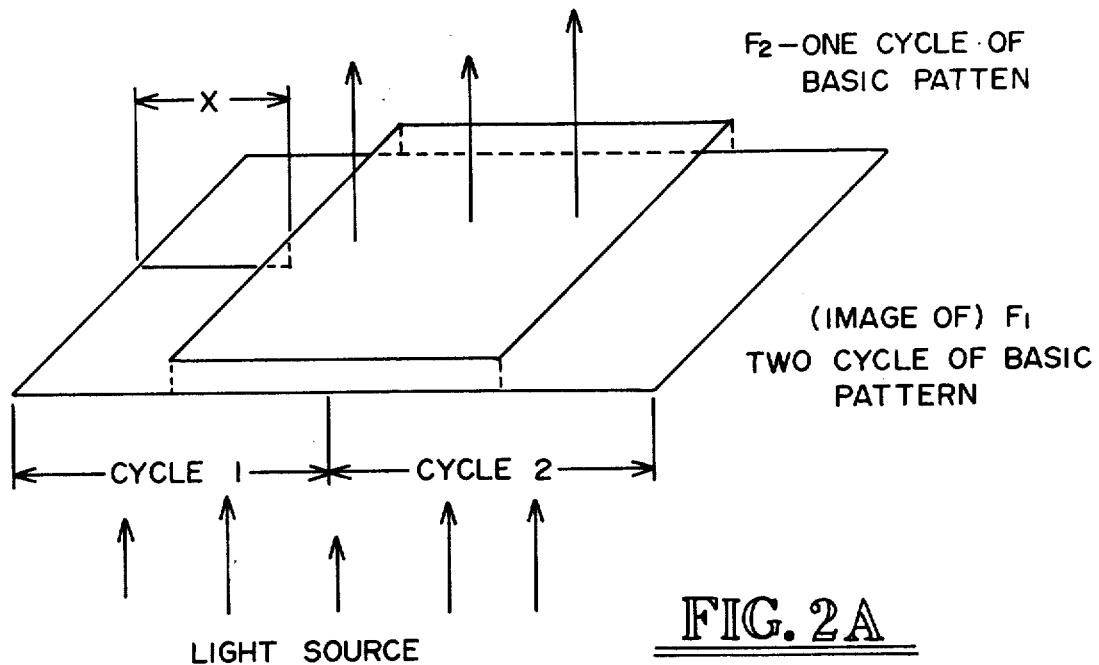
FIGS. 2A and 2B are illustrative of the properties of the patterns of spatial filters.
Figure 2B:
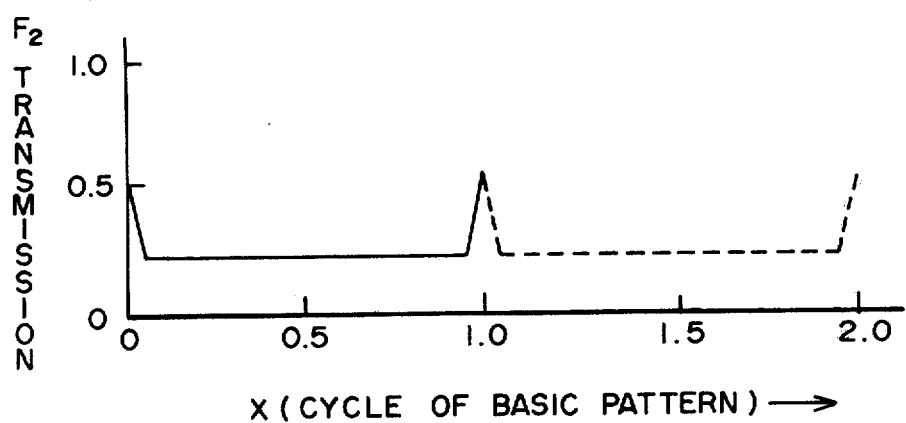

FIGS. 2A and 2B illustrate the main properties of the patterns. The basic pattern into which $F_1$ and $F_2$ are divided has $n$ elements, of which $(n + 1)/2$ are transparent, and $(n − 1)/2$ are opaque. (This pattern can be produced for all $n = 4m−1$, $m =$ integer.) The salient property of the pattern is that if one pattern is superimposed on a series of identical patterns laid end to end (FIG 2A), the light transmission through the single pattern is a maximum when, and only when, the single pattern is aligned exactly with one of the patterns of the multiple pattern (i.e., when the pattern is superimposed on itself). The maximum transmission is $(n = 1)/2n$, corresponding to light passing through $(n + 1)/2$ of the $n$ resolution elements of the basic patterns when the patterns are exactly aligned.

If the relative positions of the two patterns are changed by translating the top pattern along a direction perpendicular to the lines into which it is divided, the transmission through the pair decreases to one-half of the maximum, or $(n + 1)/4n$, a value which is constant for all translations greater than one resolution element of the pattern. FIG. 2B shows the light intensity passing through two superimposed patterns for relative translations between zero and twice the length of the basic pattern.

A further property of the pattern used is that if, in FIG. 2A, the single (top) pattern is replaced with a photographic negative of itself (i.e., opaque and transparent areas reversed), an exact superposition of the patterns results in zero transmission, while any other alignment produces constant transmission of $(n + 1)/4n$.

The final property of the basic pattern just discussed derives from the cyclic property of S. Namely, if the top, single pattern of FIG. 2A is replaced with any segment of $n$ (consecutive) resolution elements of spatial filter $F_1$, the result is that the transmission through the top spatial filter is $(n + 1)/2n$ when it is exactly aligned with the identical segment of $F_1$; for other relative positions of $F_1$ and $F_2$, the transmission is $(n + 1)/4n$.

Thus, in the specific case where a chopper 12 is utilized and the filter $F_2$ is divided into photographic negatives of each other the transmission through the combination of $F_1$ and $F_2$-1 will be a maximum for the particular wavelength $\lambda j$ for which the pattern coincides; for light of other wavelengths the transmission will be one-half of the maximum. However, when $F_1$ is imaged onto the bottom half 17 of $F_2$, the transmission will be 0 for the same wavelength, $\lambda j$. For all other wavelengths, the transmission will again be one-half the maximum.

The result is that for the wavelength $\lambda j$ the electrical signal 18 from detector 14 oscillates in phase with the chopper. Input light of other wavelengths produces no oscillating component but only a dc signal corresponding to one-fourth the intensity of light at wavelengths other than $\lambda j$. Thus, the output from detector 14 shown at 18 may be coupled to a synchronous detector which rejects all signals except those which have the same frequency as the chopper drive electronics.

As thus far described, the filter system of FIG. 1 can detect only a single wavelength. However, spatial filter $F_2$ may be modified to permit detection of more than a single wavelength. This is illustrated in FIGS. 3A and 3B. In FIG 3A each filter half $F_2$-1 and $F_2$-2 has been broken into N bands where N is equal to 4. Each pair of bands has a Hadamard pattern appropriate for the detection of a single wavelength. The +1's represent transparent elements and the 0's opaque elements.

As the chopper causes the top and bottom halves of $F_2$ to be alternately exposed to the image of $F_2$, each pair of bands $F_2$ acts as a separate detector of its specific wavelength. Thus, after synchronous detection the output signal is the sum of the intensities of the light in the four wavelength resolution elements. FIG. 4 illustrates a general case of N different wavelengths; N being equal to 11; in other words, the wavelengths $\lambda_1$ through $\lambda_{11}$. Thus, the rows $i$ represent bands for detecting the ith wavelength. The columns $j$ of which there are eleven indicate whether opaque or transparent individual resolution elements are to be used.

The foregoing summation technique has two disadvantages. First from an optical point of view, a simple chopper will not produce good results because the multiple bands of $F_2$ are not uniformly exposed to illumination from $F_1$. Secondly, it may not be desirable or informative to directly add the overall intensities but rather some partial coefficient $a_i$ may be desirable. In other words, a transmission of less than one may be desirable for one or more wavelength intervals.

Thus, as illustrated in FIG. 3B, the N bands at each half of $F_2$ may be merged into a single band which will still include the same number, $n$, of individual elements whose transmissions are the averaged or the composite of the several filter patterns for the desired wavelength. The advantage of this merger into a single pair of bands is a greater ease in providing a chopper which will not expose one band of $F_2$ more than others to light from $F_1$. As illustrated in FIG. 3B, merely a simple mathematical average has been taken for illustration purposes. For example, in the first column of elements there are two transparent filter resolution elements and two opaque elements. Thus their average is 0.5.

A mathematical description of the average process by which the N separate bands of $F_2$-1 and $F_2$-2 are converted to single bands follows. The object is, of course, to produce an electrical output proportional to $$\sum_{i=1}^{N} a_i I(\lambda_i)$$

where $I(\lambda_i) = $ intensity of the source radiation in the $i^{th}$ wavelength interval $a_i = $ constant coefficient between $-1$ and $+1$ and $N = $ number of wavelengths which are to be detected.

Referring to the matrix of FIG. 4, the rows, $i$, represent the various wavelengths, the columns $j$, the spatial resolution elements. The number in the $i^{th}$ row and $j^{th}$ column may be called $c_{ij}$. This matrix is the starting point in the procedure leading to the development of both $F_2$-1 and $F_2$-2. Moreover, FIG. 4 represents the spatial filter $F_2$-1, for the special case of $N=n=11$.

All $c_{ij}$'s are 1's or 0's. The values in row $i$ correspond to the basic pattern which will be required to detect light of wavelength $\lambda_i$. For all the values of $i$ for which its corresponding coefficient $a_i$ is greater or equal to 0 each $c_{ij}$ is replaced with $$c'_{ij} = c_{ij} a_i \qquad 1.$$

for the $F_2$-1 matrix or with $$c'_{ij} = (1 - c_{ij})a_i \qquad 2.$$

for the $F_2$-2 matrix.

Similarly, for all values of $i$ for which $a_i$ is less than 0 each $c_{ij}$ is replaced with $$c'_{ij} = (c_{ij} - 1)a_i \qquad 3.$$

for the $F_2$-1 matrix or with $$c'_{ij} = -c_{ij} a_i \qquad 4.$$

for the $F_2$-2 matrix. For each matrix all the values in each column are added resulting for each matrix in the values $$t'_j = \sum_{i=1}^{N} c'_{ij} \qquad (5)$$

Letting the largest of the $2n$ $t'_j$ values be called T, this is a normalizing factor by which all the transmission $t'_j$ are divided. Thus, the final transmission value of each of the spatial resolution elements of $F_2$-1 would be $$\frac{t'_1}{T}, \frac{t'_2}{T} \cdots \frac{t'_n}{T} \qquad (6)$$

The same normalization procedure would be followed for the elements of $F_2$-2. Physically the above procedure accomplishes the addition of contributions to the transmission of each element of the spatial filter for each wavelength along with the desired sign and coefficient. This is followed by the normalization of the transmission coefficients to 100%. A transmission greater than 100% would correspond to light amplification of which the present device is not capable. Thus, FIG. 3B shows the foregoing in a very simplified format.

That the above procedure produces the desired filter $F_2$ where the oscillating component of the light which passes through $F_2$ is proportional to $$\Sigma_i a_i I(\lambda_i)$$

can be shown by the following proof. Initially considering only the chopper position for which light from $F_1$ is able to reach the upper half of $F_2$-1 the transmission $t_{ij}$ through $F_2$-1 can be considered to be made up of the following:

a. If $a_i \geq 0$, the image of $F_1$ and the pattern of elements corresponding to the detection of $\lambda_i$ just coincide, i.e., the $(n + 1)/2$ illuminated elements of the image of $F_1$ and the $(n + 1)/2$ elements of $F_2$-1 which received transmission contributions from $a_i$ coincide, providing a transmission contribution through $F_2$ of $$\frac{a_i}{T} \cdot \frac{(n+1)}{2n}$$

b. If $a_i < 0$, the illuminated elements of the image of $F_1$ fall only on resolution elements of $F_2$-1 which received no transmission contributions from $a_i$, resulting in no transmission of $\lambda_i$.

c. Transmission contributions through $(n-1)$ sets of elements, each of which set is selected to detect a wavelength $\lambda_k$ ($k \neq i$), with either a positive negative output, providing a transmission of $$\sum_{\substack{k \neq i \\ a_k \geq 0}} \frac{(n+1)}{4n} \frac{a_k}{T} + \sum_{\substack{k \neq i \\ a_k < 0}} \frac{(n+1)}{4n} \frac{|a_k|}{T} = \sum_{k \neq i} \frac{(n+1)}{4n} \frac{|a_k|}{T}$$

The total of the three contributions above is:

$$t_{i1} = \frac{n+1}{2nT} \left[ \sum_{k \neq i} \frac{a_k}{2} + a_i \right] \quad (a_i \geq 0)$$

$$\frac{n+1}{2nT} \sum_{k \neq i} \frac{|a_k|}{2} \quad (a_i < 0)$$

The transmission through $F_2$ for chopper position No. 2 can be found in a similar way. In this case, light from $F_1$ reaches only the lower half of $F_2$, or $F_2$-2. As before, the transmission through $F_2$-2 has the following components.

a. If $a_i \geq 0$, transmission contributions proportional to $a_i$ are present in only those elements of $F_2$-2 corresponding to dark elements in the image of $F_1$, resulting in zero transmission of $\lambda_i$.

b. If $a_i < 0$, the illuminated elements in the image of $F_1$ and the pattern of elements corresponding to the detection of $\lambda_i$ just coincide, providing a transmission contribution of $$\left(\frac{n+1}{2n}\right) \frac{|a_i|}{T}$$

c. The transmission contribution by $a_k$'s for which $k \neq i$ is, as before, $$\sum_{k \neq i} \frac{(n+1)}{4n} \frac{|a_k|}{T}.$$

Adding the above, the total transmission through $F_2$-2, for monochromatic light of wavelength $i$, is $$t_{i2} = \frac{n+1}{2nT} \sum_{k \neq i} \frac{|a_k|}{2} \quad (a_i \geq 0)$$

$$\frac{n+1}{2nT} \left[ \sum \frac{a_k}{2} + |a_i| \right] \quad (a_i < 0)$$

Having found the transmission of $F_2$-1 and $F_2$-2 for light of wavelength $\lambda_i$, the electrical signal from the detection of light of this wavelength can be calculated. The current from the detector, neglecting noise, is K amperes per watt of light reaching it. This current is synchronously detected so as to extract from it only those components which have the same frequency as the chopper reference signal. A detector signal which is in phase with the chopper reference signal produces a positive output signal, while a detector signal 180° out of phase produces a negative output signal.

Comparing the expressions above for $t_{i1}$ and $t_{i2}$, it can be seen that a term $$\frac{n+1}{2nT} \sum_{k \neq i} \frac{|a_k|}{2}$$

is always present, resulting in a constant detector signal $$\frac{KI(\lambda_i)}{4} \left(\frac{n+1}{2nT}\right) \sum_{k \neq i} \frac{|a_k|}{2}$$

when light of wavelength $\lambda_i$ and intensity $I(\lambda_i)$ illuminates spatial filter $F_1$. Note that the factor 4 reflects the fact that of the source radiation which illuminates $F_1$, only one-fourth reaches $F_2$ at any given instant of time. This dc signal is rejected by the synchronous detection electronics.

The remainder of the detector signal is a square wave, ac current which alternates between zero and $$J_{peak} = \frac{KI(\lambda_i)}{4} \left(\frac{n+1}{2nT}\right) |a_i|.$$

and which is in phase with the chopper reference signal if $a_i \geq 0$, or 180° out of phase if $a_i < 0$. The output of the synchronous detector is then arranged to be a dc current equal to $$J_{peak} = \frac{KI(\lambda_i)}{4} \left(\frac{n+1}{2nT}\right) a_i$$

where the sign of $J_{peak}$ is the same as that of $a_i$.

All of the above has been calculated for a monochromatic source of wavelength $\lambda_i$, with intensity $I(\lambda_i)$ reaching $F_1$. The response of the spectrometer to a source containing N wavelengths $\lambda_k$, $k = 1, N$, is the linear superposition of the outputs of the system to N monochromatic inputs, or $$J_{out k} = \frac{K}{4}\left(\frac{n+1}{2nT}\right) \sum_{i=1}^{N} a_i I(\lambda_i).$$

Thi is just the desired result, namely, that the output signal is proportional to $$\sum_i a_i I(\lambda_i)$$

As as example suppose the device is being used to detect the presence of substance A, known to emit light at wavelengths $\lambda_1$ and $\lambda_2$. If the source were to contain only substance A, in quantity $K_A$, then the intensities $I_1$ and $I_2$ of light in the first and second wavelength intervals could be written, respectively, $I_1 = C_{A1} K_A$ and $I_2 = C_{A2} K_A$, where $C_{A1}$ and $C_{A2}$ are constants which describe how much light of wavelengths $\lambda_1$ and $\lambda_2$ is emitted per unit quantity of substance A, and which can be determined from handbook data. Suppose further that the source may contain, in addition to substance A, an unknown quantity $K_B$ of a second substance B. Substance B may also emit light,, with intensities, in wavelength intervals 1 and 2, respectively, of $C_{B1} K_B$ and $C_{B2} K_B$, so that the final observed intensities $I_1$ and $I_2$ from the mixture of substances A and B can be written, $$I_1 = C_{A1} K_A + C_{B1} K_B$$
$$I_2 = C_{A2} K_A + C_{B2} K_B$$

These two equations can be combined to yield $$K_A = \left(\frac{C_{B1} C_{B2}}{C_{A1} C_{B2} - C_{B1} C_{A2}}\right)\left(\frac{I_1}{C_{B1}} - \frac{I_2}{C_{B2}}\right)$$

Or, making the substitution $$a_1 = \frac{C_{B2}}{C_{A1} C_{B2} - C_{B1} C_{A2}}$$

$$a_2 = \frac{-C_{B1}}{C_{A1} C_{B2} - C_{B1} C_{A2}}$$

We can write $$K_A = a_1 I_1 + a_2 I_2 = \sum_{i=1}^{2} a_i I_i$$

We have therefore shown, for the specific case of N = 2, how to determine values of $a_i$ such that the sum $$\sum_{i=1}^{N} a_i I_i$$

gives a quantitative measure of the amount of substance A present, assuming, of course, that substance B is the only other substance that can be present.

The above is a more or less trivial example, but more complicated cases are attacked along the same lines.

Thus, the present invention provides an improved correlation spectrometer which can analyze a light source of multiple wavelength with physical instrumentation which has a minimum of moving parts; specifically only a chopper. Furthermore, the invention provides optical signal processing capability by means of its composite filter which eliminates the complex, time consuming computations of ordinary spectrometers.

FIG. 5 shows an alternative embodiment of the invention which in most circumstances can make the same measurements of the embodiment of FIG. 1 but is somewhat simpler in mask design and alignment. In this design, the source light 10 enters a single aperture slit 21, is collimated by a paraboloidal mirror 22, dispersed by a plane diffraction grating 23 and is refocused onto the exit mask 24. Before reaching the exit mask it is chopped by the chopper 12 in such a way that the paths into which the exit mask is divided are alternatively blocked and not blocked. After the light passes through the exit mask, it is focused onto the single photodetector 26 by a lens 27.

Exit mask 24 as is apparent does not use the Hadamard-transform properties of the spatial filters as used in the correlation spectrometer embodiment of FIG. 1. As in the embodiment of FIG. 1 each half of the exit mask is divided into N equal-size elements. However, the transmission of the $i^{th}$ element of the top half of the mask is chosen to be $a_i$ for all $a_i \geq 0$ with all other elements in the top half being opaque. Similarly, the $i^{th}$ element of the bottom half of the mask has a transmission of $-a_i$ for all $a_i < 0$, the other elements being opaque. Thus, in effect the exit mask merely selects out light of the desired wavelengths rejecting the remainder. $a_i$ is selected in accordance with the example, which is discussed supra which involved detecting the presence of a substance known to emit light at two wavelengths.

The operational result of this mask design is that of the light of all wavelengths entering the entrance slit, the upper half of the exit mask passes $$\frac{1}{2} \sum_{a_i \geq 0} a_i I(\lambda_i),$$

while the lower half passes $$\frac{1}{2} \sum_{a_i < 0} |a_i| I(\lambda_i)$$

The electrical output of the photodetector is thus a chopped current with two components, which correspond to the two phases of the chopper cycle and which are 180° apart in phase. When synchronously detected, the output is a dc current of magnitude $$(K/2) \sum_i a_i I(\lambda_i)$$

We claim:
1. A correlation spectrometer for accepting light from a source such light having a plurality of different wavelength intervals comprising: means for dispersing said light, a first spatial filter between said light source and dispersing means, a second spatial filter having photographically opposite first and second portions for receiving light which has been dispersed by said dispersing means, chopper means for chopping said dispersed light to alternatively block said dispersed light from each of said filter portions, photodetector means for sensing the light transmitted through said second filter, said first and second filters having related patterns derived from Hadamard matrices said filter patterns being a composite of a plurality of filter patterns for a plurality of selected wavelength intervals representing components of said light source, which are combined by predetermined weighting to form unitary filters which provide at said photodetector means a weighted linear combination of the intensities of said selected wavelength intervals of said light from said light source.

2. A spectrometer as in claim 1 where said photodetector means produces an electrical output proportional to $$\sum_{i=1}^{N} a_i I(\lambda_i).$$

where
$I(\lambda_i)$ = intensity of source radiation in the $i^{th}$ wavelength interval
$a_i$ = constant coefficient between $-1$ and $+1$
$N$ = number of different wavelength intervals.

3. A spectrometer as is claim 2 where said composite filter pattern is a weighted average of the patterns for detecting light in individual wavelength intervals, said weighting being proportional to the coefficients $a_i$.

4. A spectrometer as in claim 1 where said first and second filters have substantially the same effective width.

5. A correlation spectrometer for accepting light from a source such light having a plurality of different wavelength intervals comprising: means for dispersing said light, a spatial filter having first and second portions for receiving light which has been dispersed by said dispersing means, chopper means for chopping said dispersed light to alternately block said dispersed light from each of said filter portions, photodetector means for sensing the light transmitted through said filter, said first and second filters having patterns for providing a weighted linear combination of the intensities of said selected wavelength intervals of said light from said light source said photodetector means producing an electrical output proportional to $$\sum_{i=1}^{N} a_i I(\lambda_i).$$

where
$I(\lambda_i)$ = intensity of source radiation in the $i^{th}$ wavelength interval
$a_i$ = constant coefficient between $-1$ and $+1$ where at least one $a_i$ has a coefficient value other than $-1, 0,$ or $+1$
$N$ = number of different wavelength intervals.

* * * * *